Patented Oct. 27, 1936

2,058,419

UNITED STATES PATENT OFFICE 2,058,419

DIAZOIMINO COMPOUNDS AND THEIR PRODUCTION

Miles A. Dahlen, Stanley R. Detrick, Robert E. Etzelmiller, and Frithjof Zwilgmeyer, Wilmington, Del., assignors to E. I. du Pont de Nemours & Company, Wilmington, Del., a corporation of Delaware No Drawing. Application April 2, 1935, Serial No. 14,271

26 Claims. (Cl. 260—54)

This invention relates to new water and/or alkali soluble diazoimino compounds, and more particularly refers to diazoimino compounds wherein the stabilizing component is the residue of a heterocyclic compound having an imino-containing radical substituted thereon, and processes for their production.

Heretofore diazoimino compounds have been produced by coupling diazotized arylamines with amino- or imino-containing hydrocarbons of the open chain or closed chain series. U. S. Patents 1,882,560, 1,882,561 and 1,882,562 refer to compounds of this general type. Moreover, diazo-imino compounds having a heterocyclic amine as a stabilizing component have been described in U. S. Patent 1,982,681. The prior art, as represented by the aforementioned patents, describes stabilizing components which are dialkylamines, alkyl-arylamines, diarylamines and heterocyclic imines. The large number of stabilizing components coming within this category are characterized in that they are hydrocarbons of either open or closed chain derivation, and contain in addition to the hydrocarbon group or groups an amino or imino group and one or more water-solubilizing groups such as carboxylic acid and sulfonic acid. The compounds to be more fully described hereafter are entirely dissimilar thereto in that, among other features, the stabilizing components thereof are not substituted hydrocarbons but are derived from unrelated compounds which fall quite outside the aforementioned category.

It is an object of the present invention to produce a new class of compounds. A further object is to produce water and/or alkali soluble diazoimino compounds. A still further object is to produce intermediates which are of particular value in the dyeing and printing industries. A still further object is to produce diazoimino compounds which are especially adapted for use in the production of ice colors. A still further object is to produce diazoimino compounds wherein the stabilizing component is selected from a heretofore unknown class of compounds. Additional objects will become apparent from a consideration of the following description and claims.

These objects are attained according to the herein described invention wherein a diazotized aromatic amine or tetrazotized aromatic diamine is coupled with a heterocyclic compound having an imino-containing radical substituted thereon. In a more restricted sense this invention is concerned with diazoimino compounds soluble in water or alkali which are produced by coupling a diazotized aromatic amine or tetrazotized aromatic diamine, capable of use in the production of azo dyes, with a heterocyclic compound having an imino-containing radical substituted thereon and containing one or more water-solubilizing groups. This invention is directed, in its preferred embodiment, to compounds produced by coupling diazotized aromatic amines of the benzene or naphthalene series, free from water-solubilizing groups, with furfuryl-amino-acetic acid or tetra-hydro-furfuryl-amino-acetic acid.

The invention may be more readily understood by a consideration of the following illustrative examples, in which the quantities are stated in parts by weight:

Example 1

141.5 parts of 4-chloro-2-amino-toluene were stirred with 275 parts of hydrochloric acid of 30% strength. Enough ice was added to reduce the temperature to 0° C. The arylamine then was diazotized by the slow addition of a solution of 69 parts of sodium nitrite in 200 parts of water, ice being added as required to maintain the temperature at 0–5° C.

170 parts of furfuryl-amino-acetic acid were dissolved in 500 parts of water, and 200 parts of sodium carbonate were added. Ice was added to reduce the temperature to 5° C. The diazo solution prepared as described above was added slowly to the alkaline solution of furfuryl-amino-acetic acid, frequent tests being made with phenolphthalein papers. Further additions of sodium carbonate were made as required to maintain alkalinity to phenolphthalein. When all the diazo solution had been added, no test for free diazo salt was obtained upon "spotting" with alkaline R salt.

The solution was warmed to 40° C. and enough sodium chloride added to give a 20% concentration of NaCl in the solution. The diazoimino compound separated and was removed by filtration. The product was washed lightly with cold 20% sodium chloride solution. It was then dried in a vacuum drier at 70° C. The product was a light tan solid, readily soluble in water. It had the following formula:

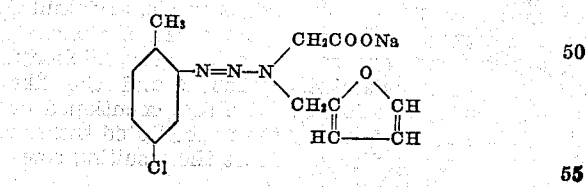

Example 2

The process of Example 1 was repeated, substituting 175 parts of tetra-hydro-furfuryl-amino-acetic acid for the furfuryl-amino-acetic acid. A product similar in appearance, but of somewhat greater solubility in water was obtained. It had the probable formula:

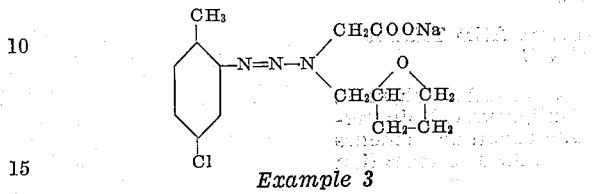

Example 3

The process of Example 1 was repeated, substituting 157.5 parts of 4-chloro-2-amino-anisole for the 4-chloro-2-amino-toluene. A product of similar appearance and properties was obtained. It had the following formula:

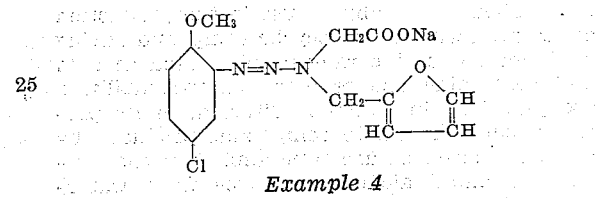

Example 4

The process of Example 1 was repeated, substituting 220 parts of 1-(furfuryl-amino)-ethane-2-sulfonic acid for the furfuryl-amino-acetic acid. A product of similar appearance and properties was obtained. It had the probable formula:

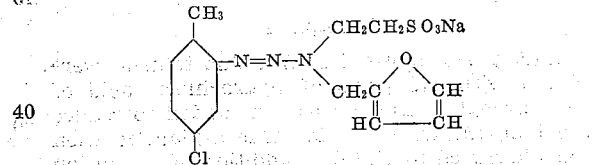

Example 5

The process of Example 1 was repeated, substituting 150 parts of beta-hydroxy-ethyl-furfuryl-amine for the furfuryl-amino-acetic acid as the stabilizing agent. A product of similar appearance but somewhat lower solubility in water was obtained. It had the probable formula:

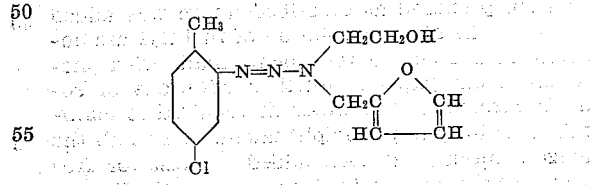

It is to be understood that the aforementioned examples are illustrative merely of a few of the many ways of carrying into practical operation the present invention. The individual components, proportions thereof, and conditions of reaction may be varied widely without departing from the scope of this invention.

Any of the numerous arylamines or arylene diamines which are well known to one familiar with the art, and in particular those arylamines which are commonly used in the azo dye art, are capable of use herein. For example, arylamines and arylene diamines of the benzene, diphenyl, naphthalene, anthracene, azobenzene, diphenyl ether, diphenylamine, carbazole and the like series may be selected. The aforementioned or related arylamines may have substituted thereon one or more radicals. Where the resulting compounds are to be used in the production of ice colors it is in general advisable that these additional substituents should not have a tendency to impart water-solubility to the resulting dyes. Consequently, it is to be understood that in its preferred embodiment this invention contemplates the use of arylamines or arylene diamines which are free from water-solubilizing groups such as the carboxylic acid and sulfonic acid groups. Where the arylamine is of high molecular weight it is possible to have one or more water-solubilizing groups substituted thereon. However, since arylamines of relatively low molecular weight are customarily used in the production of ice colors it should be noted that freedom from the aforementioned water-solubilizing group is desirable. With the exception of groups such as carboxylic and sulfonic acid it is possible to substitute one or more groups upon the arylamine or arylene diamine selected. For instance, the arylamine may have substituted thereon alkyl groups such as methyl, ethyl and propyl, alkoxy groups such as methoxy and ethoxy, halogen groups such as chlorine and bromine, nitro groups, acylamino groups, sulfonamido groups, trifluoromethyl groups, etc.

A consideration of the aforementioned instructions will render apparent the fact that arylamines conforming to the following general formulas are capable of use herein, arylamines of the benzene and naphthalene series being designated mainly for purposes of illustration:

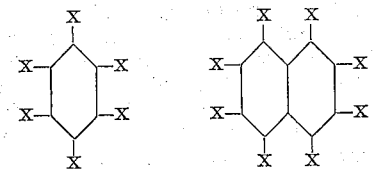

In the formulas one X represents an amino group. The remaining X's represent groups such as:

Hydrogen
Alkyl—methyl, ethyl, propyl
Alkoxy—methoxy, ethoxy, propoxy
Halogen—chlorine, bromine, iodine, fluorine
Nitro
Acylamino—acetylamino
Sulfonamid
Trifluoromethyl
Etc.

Primary amines which, as is evident from a consideration of the previous instructions, are well adapted for use herein are compounds such as the following:

Ortho-chloro-aniline
Meta-chloro-aniline
Meta-nitro-aniline
4-chloro-2-nitro-aniline
5-nitro-2-amino-anisole
4-benzoylamino-2,5-diethoxy-aniline
4-furoylamino-2,5-diethoxy-aniline
4-carbo-methoxy-amino-2,5-diethoxy-aniline
Dianisidine
Alpha-amino-anthraquinone
2-nitro-4-methyl-benzene-azo-cresidine
4,4'-diamino-diphenylamine
Ortho-ethoxy-benzene-azo-alpha-naphthylamine
Ortho-amino-diphenyl-ether
3-amino-carbazole
Alpha-naphhthylamine
Ortho-anisidine
Meta-amino-benzo-trifluoride 4-amino-anisole-2-sulfonamide
N-(para-amino-benzoyl)-aniline
5-chloro-2-amino-toluene
6-chloro-2-amino-toluene
5-chloro-2-amino-anisole
4-chloro-2-amino-phenetole
4-benzoyl-amino-2-amino-anisole The aforementioned amines and diamines are diazotized or tetrazotized and coupled with a heterocyclic compound or compounds having an imino-containing radical substituted thereon. Heterocyclic derivatives contemplated herein are exceedingly diverse in structure. In general, it may be stated that they are cyclic compounds containing one or more hetero atoms in the cyclic nucleus. Hetero atoms such as oxygen, sulfur, nitrogen, and the like have been found quite satisfactory. Where these cyclic compounds contain nitrogen as integral components of the cyclic nucleus it is to be understood that the compounds should be of such structure that coupling will not take place through the ring nitrogen group. Upon the previously described heterocyclic rings one or more radicals are substituted. One of these radicals should contain an imino (—NH—) group through which coupling with the diazotized aromatic amine or tetrazotized aromatic diamine takes place. In order that coupling will take place through the aforementioned imino group it is advisable to select heterocyclic compounds which do not have other external substituents or ring substituents which would interfere with this coupling. The substituent containing the imino group may also contain additional groups such as carboxyl, sulfonic acid, hydroxyl, sulfinic, sulfato, hydrocarbon groups of open chain or cyclic character, and the like.

A few of the many compounds coming within this category may be represented by the following heterocyclic derivatives:

1. Furfuryl-sorbityl-amine

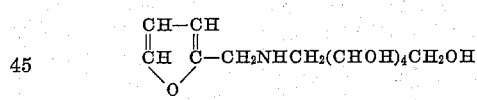

2. Tetra-hydro-furfuryl-sorbityl-amine

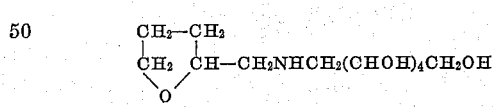

3. 3-methyl-amino-2-furoic acid

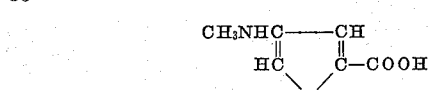

4. Alpha-pyridyl-amino-acetic acid

5. 3-methylamino-benzo-pyrane-ar-sulfonic acid

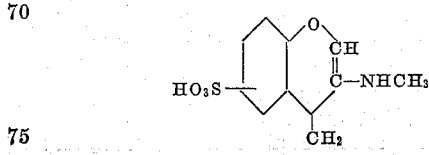

6. Dioxanyl-amino-acetic acid

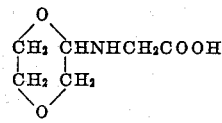

7. 3-(1-methyl-morpholino)-glycine

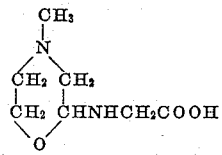

8. Beta-thienyl-taurine

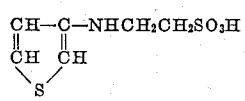

9. Alpha-thienyl-glycamine

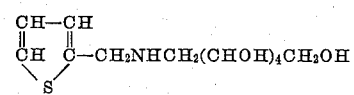

10. (1,4-dimethyl-piperazino)-methyl-glycine

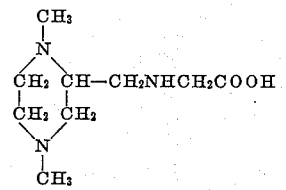

11. Para-sulfo-phenyl-furfuryl-amine

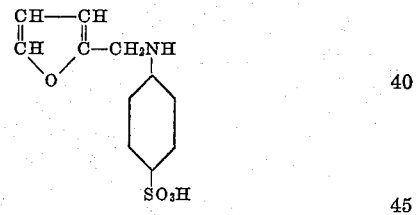

12. Para-hydroxy-cyclohexyl-tetra-hydro-furfuryl-amine

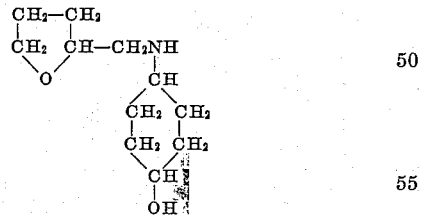

13. Difurfuryl-amine-4,4'-dicarboxylic acid

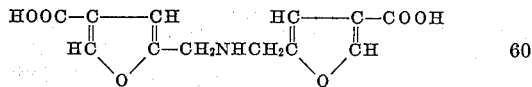

14. Beta-sulfato-ethyl-tetra-hydro-furfuryl-amine

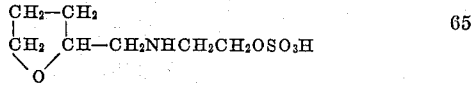

In particular it has been found that heterocyclic compounds of the furane series are adapted for use herein. These compounds may be derivaties, for example, of furane or partially or completely hydrogenated members of the same series. As is clear from a consideration of the above, the furane or tetra-hydro-furane derivatives selected have an imino-containing radical substituted thereon. In order to produce water and alkali soluble diazoimino compounds the heterocyclic derivatives selected should have at least one water-solubilizing group substituted thereon. Water solubilizing groups which are suitable for this purpose are the carboxylic acid (—COOH), the sulfonic acid (—SO₃H), the hydroxyl (—OH), sulfinic acid (—SO₂H), the sulfato (—OSO₃H), etc. groups. These groups may be substituted upon the heterocyclic nucleus, and/or upon the imino-containing substituent and/or upon some other additional external substituent, so long as they do not prevent coupling from taking place through the imino group. They are preferably substituted on the imino-containing substituent. Since the degree of water solubility which the various groups impart to the resulting molecule depends to a considerable extent upon the structure of the molecule as well as upon the individual solubilizing group selected, it is to be understood that more than one solubilizing group may be utilized. For optimum results it is ordinarily advisable to select either the carboxylic acid or sulfonic acid group for solubilization purposes.

Compounds of the furane series which are preferred for use herein may, for the most part, be designated by the following general formula:

$$R-CH_2NH-X$$

wherein R represents a furane or tetra-hydro-furane nucleus and X represents the residue of an aliphatic hydrocarbon which has substituted thereon a carboxylic or sulfonic acid group. These and related compounds are described in considerable detail, and are claimed, in a copending application Serial No. 19,145 filed May 1, 1935, and it is to be understood that the instructions of said application are applicable hereto in the same manner as if they were contained herein.

Coupling of the diazotized arylamine with the heterocyclic derivative is preferably effected in the presence of acid binding agents. These agents are well known and need not be described in detail herein, although for purposes of illustration it may be stated that they are principally alkali hydroxides, -carbonates, -bicarbonates, -acetates, etc. and in particular the sodium derivatives thereof. The diazo solution is added to the solution of the stabilizer, preferably at a low temperature. Frequent tests may be made for unreacted diazo and for alkalinity. Additional stabilizers and acid binding agents may be added as required in order to convert completely the diazo salt to the diazoimino compound. When the reaction is complete the diazoimino compound may be precipitated by the addition of the necessary amount of "salting" agent. As in the case of acid binding agents "salting" agents are well known, and may be represented by the following: sodium chloride, sodium sulfate, potassium chloride and the like. The diazoimino compound may then be separated from the mother liquor and dried under suitable conditions. In the event that the diazoimino compounds are not precipitated by "salting" agents the entire reaction mixture may be evaporated to dryness, preferably under reduced pressure. The product may be separated from the inorganic salts by extraction with a solvent, such as ethyl alcohol, in which the diazoimino compound is soluble but the inorganic salts are insoluble. The diazoimino compounds are isolated by evaporating the alcohol solutions to dryness.

Many of the diazoimino compounds contemplated herein may be represented by the following general formula:

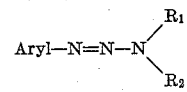

wherein aryl represents an aromatic nucleus which may have substituted thereon non-water-solubilizing groups, R₁ represents an alkyl, carbocyclyl, carbo-cyclyl-alkyl, hetero-cyclyl or hetero-cyclyl-alkyl radical, and R₂ represents a heterocyclyl or hetero-cyclyl-alkyl radical, and wherein R₁ and/or R₂ contains one or more water-solubilizing groups.

The above described diazoimino compounds may be used for a variety of purposes, chief among which is the production of ice colors. In the production of ice colors these compounds are mixed with approximately equivalent quantities of ice color coupling components. Textile fibers may then be impregnated with alkaline pastes containing such mixtures, the color being developed thereon by subjecting these fibers to the action of heat and mild acids, such as acetic or formic acids. Under these hydrolyzing conditions the diazoimino compound reverts to the parent diazo salt and the latter couples with the ice color coupling component thereby dyeing the impregnated fibers. Among the ice color coupling components which have been found to be particularly suitable for use in combination with the products of this invention are the following:

1. Arylamides of 2-3-hydroxy-naphthoic acid and other hydroxy-aryl-carboxylic acids
2. Acyl-acetyl derivatives of arylamines
3. Alpha and beta-naphthol
4. Aryl-alkyl pyrazolones
5. Dihydroxy-quinolines A typical mixture of one of the diazoimino compounds described herein and a well known ice color coupling component is:

52 parts of the diazoimino compound corresponding to the formula given in Example 2
48 parts of the ortho-toluidide of 2-3-hydroxy-naphthoic acid When cotton piece goods are printed with a paste containing the above mixture, then developed in the usual manner, the pattern is produced as a bright red dye of excellent fastness properties.

By means of the present invention an entirely new class of chemical compounds is produced. These compounds are exceptionally valuable in the production of diazoimino compounds for use in the ice color art. The stabilizing components are readily available and may be produced at a very reasonable cost. Due to the presence of the heterocyclic nucleus which is free from a reactive imino group the processes whereby these compounds are formed and wherein they are used for the production of ice colors are improved to a surprising extent.

As many apparently widely different embodiments of this invention may be made without departing from the spirit and scope thereof, it is to be understood that the invention is not limited to the specific embodiments thereof except as defined in the appended claims.

We claim:
1. A process for producing new compounds which comprises coupling a member selected from the group consisting of diazotized aromatic amines and tetrazotized aromatic diamines with a heterocyclic compound having an imino-containing radical substituted thereon, coupling taking place through the imino group of the aforesaid radical, said heterocyclic compound containing at least one water-solubilizing group.

2. A process for producing new compounds which comprises coupling a member selected from the group consisting of diazotized aromatic amines and tetrazotized aromatic diamines of the benzene or naphthalene series, free from water-solubilizing groups, with a heterocyclic compound having an imino-containing radical substituted thereon, coupling taking place through the imino group of the aforesaid radical, said heterocyclic compound containing at least one water-solubilizing group.

3. A process for producing new compounds which comprises coupling a member selected from the group consisting of diazotized aromatic amines and tetrazotized aromatic diamines with a compound containing a furane grouping having an imino-containing radical substituted thereon, said furane compound containing at least one water-solubilizing group.

4. A process for producing new compounds which comprises coupling a member selected from the group consisting of diazotized aromatic amines tetrazotized aromatic diamines of the benzene or naphthalene series, free from water-solubilizing groups, with a compound containing a furane grouping having an imino-containing radical substituted thereon, said furane compound containing at least one water-solubilizing group.

5. A process for producing new compounds which comprises coupling a diazotized aromatic amine of the benzene or naphthalene series, free from water-solubilizing groups, with a compound containing a furane grouping having an imino-containing radical substituted thereon, said furane compound containing at least one water-solubilizing group.

6. A process for producing new compounds which comprises coupling a diazotized aromatic amine of the benzene or naphthalene series, free from water-solubilizing groups, with a compound containing a tetra-hydro-furane radical having an imino-containing radical substituted thereon, said tetra-hydro-furane compound containing at least one water-solubilizing group.

7. A process for producing water-soluble compounds which comprises coupling a diazotized aromatic amine of the benzene series, free from carboxylic or sulfonic acid groups, with furfuryl-amino-acetic acid.

8. A process for producing water-soluble compounds which comprises coupling a diazotized aromatic amine of the benzene series, free from carboxylic or sulfonic acid groups, with tetra-hydro-furfuryl-amino-acetic acid.

9. A process for producing water soluble diazoimino compounds which comprises coupling a diazotized aromatic amine of the benzene series, suitable for use in the production of ice colors, with furfuryl-amino-acetic acid.

10. A process for producing water-soluble diazoimino compounds which comprises coupling a diazotized aromatic amine of the benzene series, suitable for use in the production of ice colors, with tetra-hydro-furfuryl-amino-acetic acid.

11. A process for producing water-soluble diazoimino compounds which comprises coupling diazotized 4-chloro-2-amino-toluene with furfuryl-amino-acetic acid.

12. A process for producing water-soluble diazoimino compounds which comprises coupling diazotized 4-chloro-2-amino-toluene with tetra-hydro-furfuryl-amino-acetic acid.

13. A process for producing water-soluble diazoimino compounds which comprises coupling diazotized 4-chloro-2-amino-anisole with furfuryl-amino-acetic acid.

14. Compounds having the following general formula:

$$R-(-N=N-Z)_n$$

wherein R represents the residue of a diazotized aromatic amine or tetrazotized aromatic diamine, Z represents the radical of a heterocyclic compound having an imino-containing radical substituted thereon, coupling taking place through the imino group of the aforesaid radical, said heterocyclic compound containing at least one water-solubilizing group, and $n$ represents the integer 1 or 2.

15. Compounds having the following general formula:

$$R-(-N=N-Z)_n$$

wherein R represents the residue of a diazotized aromatic amine or tetrazotized aromatic diamine of the benzene or naphthalene series, free from water-solubilizing groups, Z represents the radical of a heterocyclic compound having an imino-containing radical substituted thereon, coupling taking place through the imino group of the aforesaid radical, said heterocyclic compound containing at least one water-solubilizing group, and $n$ represents the integer 1 or 2.

16. Compounds having the following general formula:

$$R-(-N=N-Z)_n$$

wherein R represents the residue of a diazotized aromatic amine or tetrazotized aromatic diamine, Z represents the radical of a compound containing a furane grouping having an imino-containing radical substituted thereon, said furane compound containing at least one water-solubilizing group, and $n$ represents the integer 1 or 2.

17. Compounds having the following general formula:

$$R-(-N=N-Z)_n$$

wherein R represents the residue of a diazotized aromatic amine or tetrazotized aromatic diamine of the benzene or naphthalene series, free from water-solubilizing groups, Z represents the radical of a compound containing a furane grouping having an imino-containing radical substituted thereon, said furane compound containing at least one water-solubilizing group, and $n$ represents the integer 1 or 2.

18. Compounds having the following general formula:

$$R-N=N-Z$$

wherein R represents the residue of a diazotized amine of the benzene or naphthalene series, free from water-solubilizing groups, and Z represents a compound containing a furane grouping having an imino-containing radical substituted thereon, said furane compound containing at least one water-solubilizing group.

19. Compounds having the following general formula:

$$R-N=N-Z$$

wherein R represents the residue of a diazotized amine of the benzene or naphthalene series, free from water-solubilizing groups, and Z represents a compound containing a tetra-hydro-furane radical having an imino-containing radical substituted thereon, said tetra-hydro-furane compound containing at least one water-solubilizing group.

20. Compounds having the following general formula:

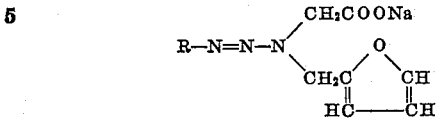

wherein R represents the residue of a diazotized aromatic amine of the benzene series, free from carboxylic or sulfonic acid groups.

21. Compounds having the following general formula:

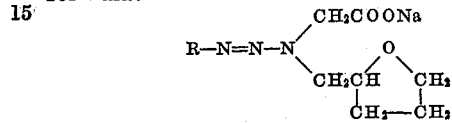

wherein R represents the residue of a diazotized aromatic amine of the benzene series, free from carboxylic or sulfonic acid groups.

22. Water-soluble diazoimino compounds having the following general formula:

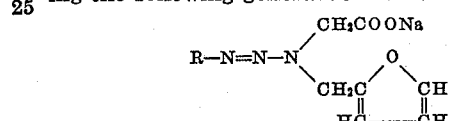

wherein R represents the residue of a diazotized aromatic amine of the benzene series, suitable for use in the production of ice colors.

23. Water-soluble diazoimino compounds having the following general formula:

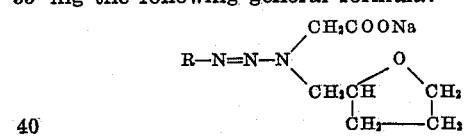

wherein R represents the residue of a diazotized aromatic amine of the benzene series, suitable for use in the production of ice colors.

24. A water-soluble diazoimino compound having the following formula:

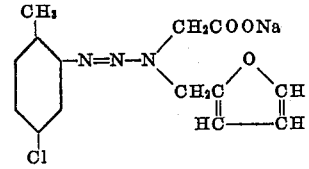

which is a light tan solid readily soluble in water.

25. A water soluble diazoimino compound having the following formula:

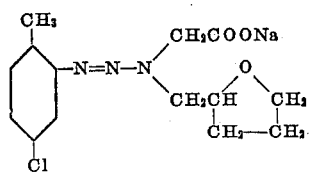

which is a light tan solid readily soluble in water.

26. A water soluble diazoimino compound having the following formula:

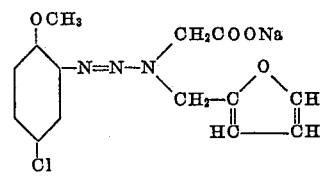

which is a light tan solid readily soluble in water.

MILES A. DAHLEN.
STANLEY R. DETRICK.
ROBERT E. ETZELMILLER.
FRITHJOF ZWILGMEYER.